(12) United States Patent
Briesch et al.

(10) Patent No.: US 8,414,667 B2
(45) Date of Patent: Apr. 9, 2013

(54) SUPERCRITICAL PRESSURIZATION OF FUEL SLURRY

(75) Inventors: Michael S. Briesch, Orlando, FL (US); Terrence B. Sullivan, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 1723 days.

(21) Appl. No.: 11/351,976

(22) Filed: Feb. 10, 2006

(65) Prior Publication Data
US 2007/0186476 A1  Aug. 16, 2007

(51) Int. Cl.
*C10L 3/00* (2006.01)
(52) U.S. Cl. .................................... 48/197 FM
(58) Field of Classification Search ............. 48/197 R
See application file for complete search history.

(56) References Cited

U.S. PATENT DOCUMENTS

| 4,338,199 A | 7/1982 | Modell |
| 4,364,740 A * | 12/1982 | Massey et al. ............... 44/621 |
| 4,543,190 A | 9/1985 | Modell |
| 5,170,727 A * | 12/1992 | Nielsen .................... 110/346 |
| 6,495,110 B1 * | 12/2002 | Higo et al. ................ 422/201 |

* cited by examiner

Primary Examiner — Imran Akram

(57) ABSTRACT

A system (10) and a method for converting carbonaceous fuel (102) into a gaseous product (42). According to one embodiment a fuel slurry (118) is introduced into a chamber (120) and heated under sufficient pressure to prevent the carrier component (100) from boiling so that the carbonaceous component (102) does not separate from the carrier component (100). The step of heating the carrier component (100) may include increasing pressure and temperature to place the carrier component (100) in a supercritical state while sustaining the carbonaceous component (102) and carrier component (100) in a mixed state. In this embodiment a pump (136) imposes sufficient chamber pressure to prevent boiling of the carrier component (100) as the mixture is heated to at least 345° C., and a gasifier chamber (120) is positioned to receive the gaseous mixture (118) at a lower pressure than the supercritical pressure for creation of syngas (42).

12 Claims, 2 Drawing Sheets

SUPERCRITICAL PRESSURIZATION OF FUEL SLURRY

FIELD OF THE INVENTION

The present invention relates to gasification of carbonaceous fuels and, more particularly, to delivery systems and methods which increase gasifier efficiency.

BACKGROUND OF THE INVENTION

The efficiency of conventional power plants has been markedly improved with the integration of the combustion turbine and a variety of heat recovery techniques. To improve energy efficiency and enhance the environmental acceptability of fossil fuels, it is advantageous to include a gasification stage in combined cycle power plants. In these systems a carbonaceous fuel such as coal is converted to syngas, a gaseous mixture formed during a high temperature partial oxidation. This combination of features is commonly referred to as an Integrated Gasification Combined Cycle, or IGCC.

In an IGCC the syngas is fed to a combustion turbine from which exhaust heat is applied to generate steam for a subsequent power stage, and/or to heat incoming materials associated with the combustion cycle. Components of syngas vary considerably depending on the fuel source and reaction conditions. For coal gasification, typical constituents of syngas include $CO_2$, $CO$, $H_2$ and $CH_4$. Often syngas will include sulfides and nitrous components. The latter are normally removed from the mixture prior to combustion in order to provide an environmentally cleaner exhaust gas from the combustion turbine.

The IGCC is coming into greater use in power production because the overall efficiencies are attractive and the technology presents greater opportunities to deploy coal, an abundant resource, in an economical and clean manner. The efficiency advantage of burning gasified coal in power plants stems in part from the combined cycle, wherein hot gases leaving the combustion turbine are used to raise steam temperature in a conventional Rankine cycle. With a typical gasification efficiency of about 80 percent, and a combined cycle efficiency (combustion and steam turbine) of about 58 percent, it is possible to achieve an overall plant efficiency of 46.8 percent. By way of comparison, the overall efficiency of a typical steam turbine power plant is less than 40 percent although newer ultrasupercritical cycle designs may approach efficiencies up to 45 percent.

More generally, the cold gas efficiency should be at least 78 percent to render the IGCC commercially attractive. The efficiency of the coal gasification process is dependent in part on the gasification temperature which, in turn, is a function of the reactivity of the coal species. It is desirable to react the coal at as low a temperature as possible, as this will maximize the heating value in the syngas relative to the feedstock. However, due to the equilibrium dynamics of the conversion process, reaction temperatures range from about 1400° C. to about 1500° C. (2550° F. to 2730° F.) for various coal species. As a result, gasification efficiencies above 80 percent have been difficult to achieve in large scale commercial operations. Given these constraints, other means of improving the efficiency of gasification are sought, as even small improvements in plant efficiency have large impacts on the cost and viability of energy production from carbonaceous solid fuel sources.

SUMMARY OF THE INVENTION

According to one embodiment of the invention, in a process for conversion of carbonaceous fuel to a gaseous product, a fuel slurry is introduced into a high pressure chamber. Initially the slurry may be a mixture of a solid granulated carbonaceous component and a liquid carrier component. The slurry is heated under sufficient pressure to prevent the carrier component from boiling. Accordingly the carbonaceous component does not separate from the carrier component. The mixture is transferred through an orifice or other means of pressure reduction to a lower pressure chamber for combustion without separating the solid component from the gaseous carrier component. In numerous embodiments the carrier component comprises water and the carbonaceous component comprises coal.

By way of example, the step of heating the carrier component may include increasing pressure and temperature to place the carrier component in a supercritical state while sustaining the carbonaceous component and the carrier component in a mixed state. The desired pressure may be attained by pumping a sufficient quantity of the slurry into the high pressure chamber to reach a supercritical pressure while elevating the temperature of the mixture and before transferring the mixture through the orifice.

A system is also provided for converting a slurry comprising solid, granulated carbonaceous material such as coal or coke into a syngas. One embodiment of the system includes a high pressure chamber for receiving a mixture of the solid carbonaceous material and a liquid carrier material. A pump imposes sufficient chamber pressure to prevent boiling of the carrier material as the mixture is heated to at least 345° C. (650° F.). A heat source effects heating of the mixture to at least 345° C. (650° F) in the chamber. A gasifier chamber is positioned to receive the gaseous mixture at a lower pressure than the supercritical pressure for creation of syngas. The combination of the pump and the heat source impart sufficient pressure and thermal energy to place the liquid carrier material above its critical point.

A power system according to the invention includes a combustion turbine, a gasifier coupled to provide syngas to the turbine, and a high pressure chamber for receiving a fuel slurry. The slurry may be a mixture of a solid granulated carbonaceous component and a carrier component. A pump imposes sufficient chamber pressure to prevent boiling of the carrier component as a heat source effects heating of the mixture to at least 345° C. (650° F.) in the chamber. An expansion valve is positioned to pass the mixture while under a relatively high pressure into a lower pressure region within the gasifier.

In the disclosed embodiments the pump may be configured to pressurize a slurry to at least 218bara (3161 psia) and the heat source elevates the slurry from ambient conditions to a temperature of at least 345° C. (650° F.) without allowing the carrier component, e.g., water, to boil. The slurry may be pressurized to a supercritical level prior to heating the slurry or pressurization to the supercritical level may in conjunction with heating of the slurry to at least 345° C. (650° F.).

BRIEF DESCRIPTION OF THE DRAWINGS

The above and other aspects of the invention will become more apparent in light of the following detailed description when read in conjunction with the accompanying drawings, wherein.

DETAILED DESCRIPTION OF THE INVENTION

Figure 1:
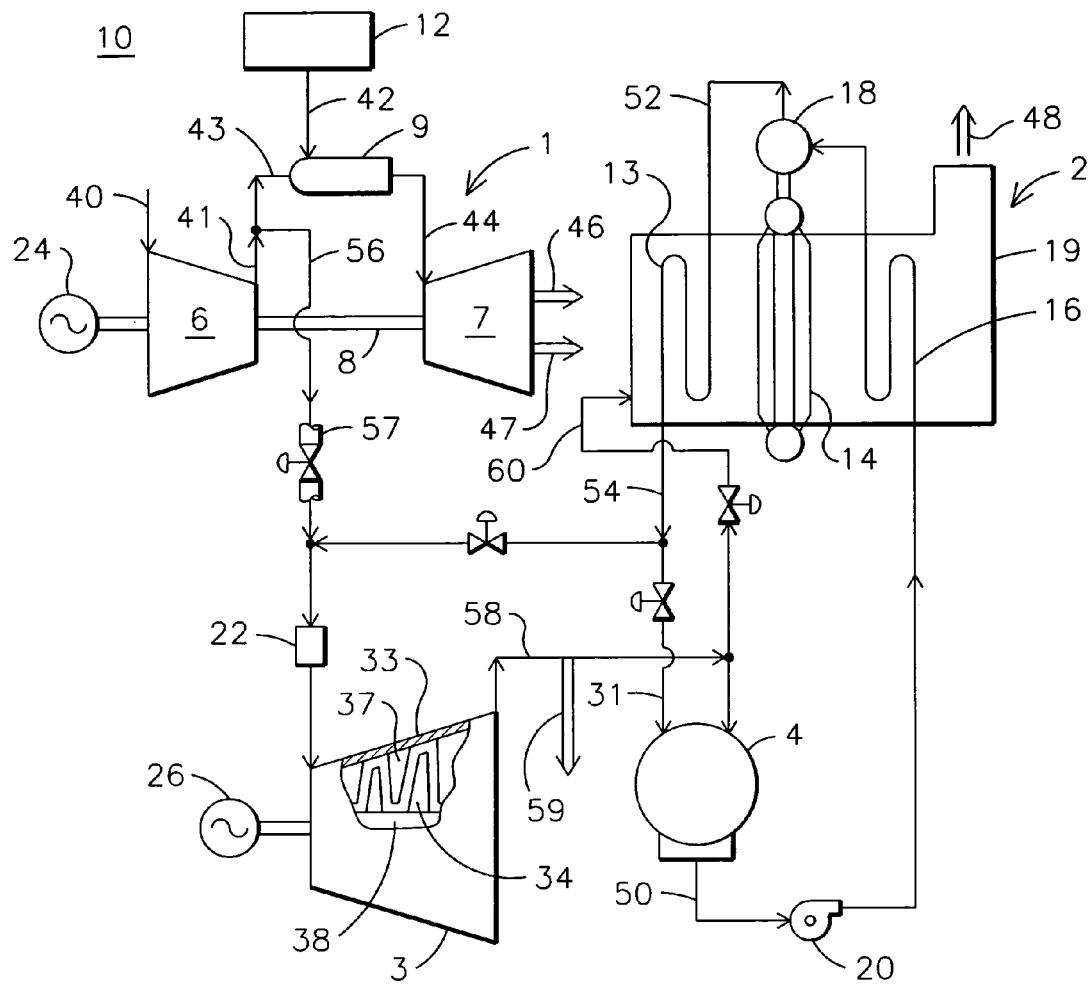
FIG. 1 illustrates components of a power plant incorporating the invention.

With reference to FIG. 1 there is shown an exemplary IGCC power plant 10 incorporating principles of the invention. While the invention is described with reference to an IGCC plant, the concepts are directly transferable to the many applications and other systems in which carbonaceous solid fuels are gasified, including production of gases which are transported for combustion at a remote location.

The plant 10 includes numerous well-known components, including a gas turbine section 1, a heat recovery steam generator 2 ("HRSG"), a steam turbine 3, and a condenser 4. The gas turbine section 1 includes a compressor 6, a turbine 7 having a rotor shaft 8 connected to the compressor 6 and to an electrical generator 24, and a combustor 9. As more fully described herein, the combustor receives fuel from a gasification system 12 constructed according to the invention.

The HRSG 2 includes a superheater 13, an evaporator 14, a steam drum 18, and an economizer 16. The steam turbine 3 includes a rotor 38 mounted for rotation within a casing 33 so as to form a flow path wherein steam travels across a plurality of the rotating blades 34 and stationary vanes 37 to transfer power.

In operation, the compressor 6 inducts ambient air 40 and compresses it, thereby producing compressed air 41. The compressed air 41 will typically be heated in excess of 260° C. (500° F.), at a pressure on the order of 700bara (100 psia) when the gas turbine rotor shaft 8 is at a steady state operating speed, e.g., 3600 RPM.

A portion (not shown) of the compressed air 41 produced by the compressor 6 is typically directed to the turbine 7 for cooling therein. During steady state operation of the power plant, the remainder 43 of the compressed air 41 is directed to the combustor 9, along with a syngas fuel 42 received from the gasification system 12, according to the invention. The compressed air 43 may be oxygen enriched. During start-up, a portion 56 of the compressed air 41 produced by the compressor 6 may be used for warming the steam turbine 3.

In the combustor 9, the fuel 42 is introduced into the compressed air 43 via a nozzle (not shown). The fuel 42 burns in the compressed air, thereby producing a hot, compressed gas 44. The hot gas 44 is then directed to the turbine 7. In the turbine 7, the hot gas 44 is expanded, thereby producing power in the rotor shaft 8 that drives both the compressor portion of the rotor and the electrical generator 24. The expanded gas 46 is then exhausted from the turbine 7. As a result of having been expanded in the turbine 7, the temperature of the expanded gas 46 exhausting from the turbine 7 is considerably less than the temperature of the hot gas 44 entering the turbine. Nevertheless, in a modern gas turbine operating at full load, the temperature of the expanded gas 46 is still relatively hot, typically in the range of 450°-620° C. (850°-1150° F.).

From the turbine 7, the expanded gas 46 is directed to the HRSG 2 and through ductwork so that it flows successively over the superheater 13, the evaporator 14 and the economizer 16. A portion 47 of the expanded gas may also be directed to a high temperature heat exchanger 144 in the gasification system 12. See also FIG. 2. After flowing through the HRSG 2, the cooled, expanded gas 48 is then discharged to atmosphere via a stack 19. As is conventional, the superheater 13, the evaporator 14 and the economizer 16 may have heat transfer surfaces formed of finned tubes. The expanded gas 46 flows over these finned tubes while feed water or steam flows within the tubes. In the HRSG 2, the expanded gas 46 transfers a considerable portion of its heat to the feedwater/steam, thereby cooling the gas and transforming the feedwater into steam.

In addition to the expanded gas 46 discharged by the gas turbine 1, the HRSG 2 receives a flow of feed water 50 from the condenser 4 that has been pressurized by pump 20. As is conventional, the feed water first flows through the heat transfer tubes of the economizer 16, where its temperature is raised to near the saturation temperature. The heated feedwater from the economizer 16 is then directed to the steam drum 18. From the steam drum 18, the water is circulated through the heat transfer tubes of the evaporator 14 which converts the feedwater into saturated steam 52 which is then directed to the superheater 13, wherein its temperature is raised into a superheated region and then provided to a steam chest 22 that distributes the steam to the inlet of the steam turbine 3.

In the steam turbine 3, the steam 54 flows through the casing 33 and over the rows of rotating blades 34 and stationary vanes 37, only a few of which are shown in FIG. 1. In so doing, the steam 54 expands and generates shaft power that drives the rotor 38 which, in turn, drives a second electrical generator 26. Alternately, the steam turbine rotor 38 could be integrally formed along the gas turbine rotor shaft 8 to drive a single electrical generator. The expanded steam 58 exhausted from the steam turbine 3 is directed to the condenser 4 and eventually returned to the HRSG 2. A portion 59 of the expanded steam 58 may be diverted to a low temperature heat exchanger 142 in the gasification system 12.

Figure 2:
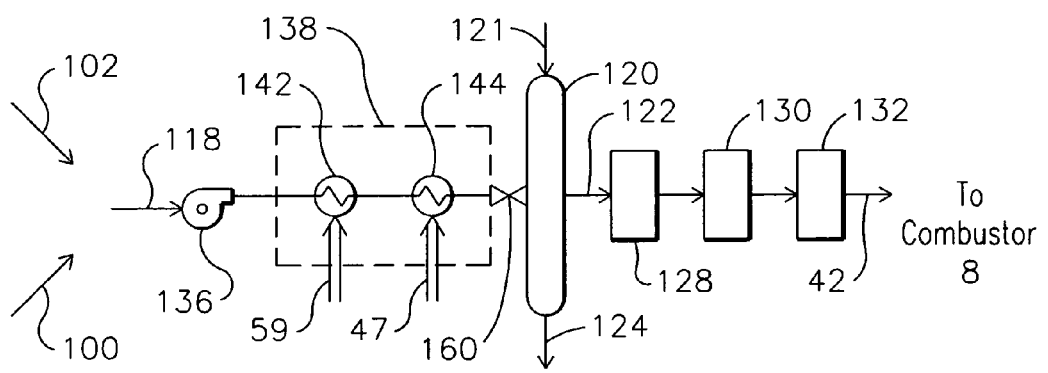
FIG. 2 illustrates a gasification system in the power plant of FIG. 1.

With reference to FIG. 2, a carrier component 100 and a finely granulated (e.g., less than 10 mm in size) solid carbonaceous fuel component 102, such as coal, combine to form a slurry 118 which is injected into a pressurized gasifier chamber 120. The carrier component may be water, but water-based mixtures and other liquids may form the carrier component. An oxygen supply 121 is separately injected to react with the slurry 118 and produce an intermediate gas product 122 at a reaction temperature on the order of 1500° C. (2730° F.). Slag 124 is removed from a lower portion of the chamber 120. The gas product is passed through a cooler 128 prior to removal of char in an extraction stage 130, followed by removal of sulfur and corrosive constituents in a cleaner stage 132. The resulting syngas 42 may, for example, predominantly consist of carbon monoxide, hydrogen, carbon dioxide and steam.

A feature of the invention is the provision of the slurry 118 to the gasifier chamber 120 under supercritical or near-supercritical conditions. The ratio of heating value of the product gas to the heating value of the coal feedstock is a function of the reaction temperature in the gasifier chamber 120. Consequently, the cold gas efficiency of the product gas is a direct function of the reaction temperature.

In the past, slurry has only been heated to a limited degree prior to the gasification reaction, e.g., to about 177° C. (350° F.). Heating the slurry to a significantly higher temperature has been avoided because this is commonly regarded as problematic. That is, heating to higher temperatures is known to result in a separation of solid granulated fuel from the water. If the slurry carrier is allowed to enter the vapor phase it will separate from the solid components, creating non-uniform and unacceptable slurry flow characteristics. Recognizing this constraint, prior to injection of the slurry into the gasification chamber, it is conventional to retain the mixture of solid granulated carbonaceous component (e.g., coal) and carrier component (e.g., water) in a liquid slurry form, pressurized slightly higher than the pressure in the gasification chamber. Only after the liquid slurry enters the relatively hot environment of the gasification chamber (at a somewhat lower pressure), has the liquid carrier component of the slurry entered the vapor phase.

Figure 3:
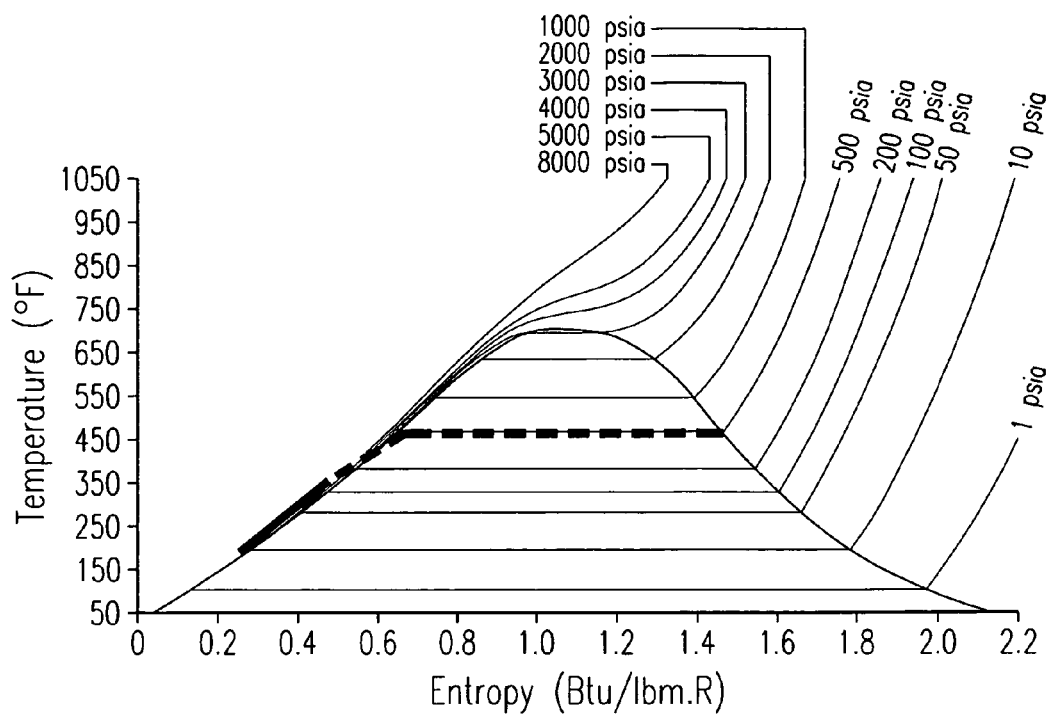
FIG. 3 illustrates a conventional heating process.

An example of this conventional heating process is shown in FIG. 3, in which the temperature increase of a liquid, non-boiling carrier component is plotted with respect to the entropy. Specifically, prior to injection into a gasification chamber, the water-based slurry 118, initially at room temperature and atmospheric conditions, is preheated up to 177° C. (350° F.) under sufficient pressure, i.e., at least 14bara (205 psia) to prevent the water therein from boiling. Once the slurry reaches the desired temperature it enters the gasification chamber where the temperature reaches 1500° C. (2730° F.) during syngas production.

In the gasification system 12 a pump 136 delivers the slurry 118 into a pressurized heating flow path 138. The pump 136 subjects the slurry to a large pressure transition, e.g., from atmospheric pressure to above 218 bara (3160 psia). Generally, with water being the primary constituent of the carrier material, the flow path 138 may be pressurized in the range of 207bara to 552bara (3000 to 8000 psia) or higher. In the flow path 138 the liquid slurry is passed through one or more heating stages. As illustrated in FIG. 2, the flowing slurry may initially pass through a low-temperature heat exchanger 142 which may transfer heat to the slurry 118 from a portion 59 of the expanded steam 58 to elevate the slurry temperature. A higher temperature elevation is then effected by directing heat from the portion 47 of the turbine exhaust gas 46 into a high temperature heat exchanger 144 to bring the carrier temperature above 375° C. (750° F.). Heat transferred to the cooler 128 may also be applied along the heating flow path 138.

Figure 4:
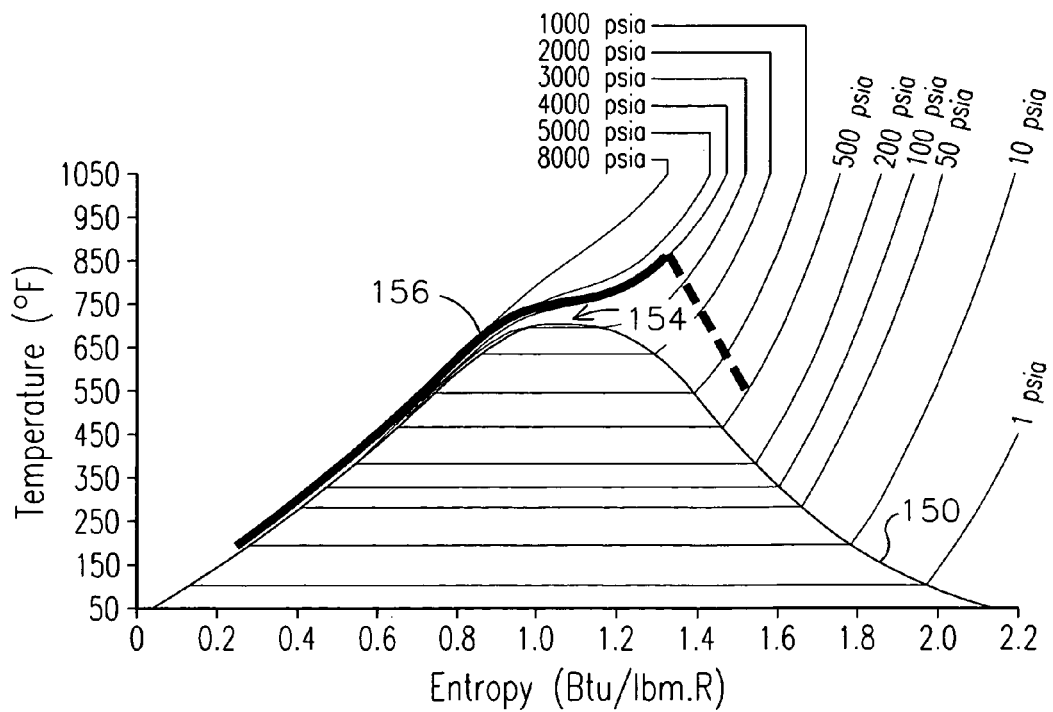
FIG. 4 illustrates a heating process according to the invention.

An exemplary heating process for gasifying the slurry 188 is further illustrated in the entropy-temperature diagram of FIG. 4. The characteristic liquid-vapor region of the slurry water, within the confines of the curve 150, is shown in order to compare state conditions according to the invention with conventional heating processes. The curve 150 includes a maximum corresponding to the characteristic critical point 154 of water. Above the critical point, the carrier component only exists in the gaseous state, referred to as a supercritical gaseous state. An example of the inventive process by which the slurry temperature is elevated is illustrated by the curve 156. With the slurry initially at ambient atmospheric conditions, the slurry is pressurized to 276bara (4000 psia) and is then heated to approximately 427° C. (800° F.).

Temperature elevation under this pressure condition assures that the water does not simultaneously exist as both a vapor and a liquid at any given temperature, i.e., the state conditions remain outside the curve 150. Under these conditions the water can remain in a continuous fluid state without a separation of vapor from liquid. Such separation would result in segregation of the solid coal fuel component from a vapor component. In the example of FIG. 4 the slurry water exceeds the critical point 154. The 427° C. (800° F.) slurry is then delivered to the gasifier chamber 120 through a pressure reduction element 160 such as a contollable expansion valve or an orifice, to resume a somewhat lower pressure.

By elevating slurry temperature while the slurry is at a supercritical pressure, i.e., in the high pressure flow path 138, the slurry water remains under state conditions external to the curve 150. Thus the heated slurry does not separate and also carries greater thermal energy as it flows into the gasifier chamber 120. With this higher internal energy it becomes possible to achieve higher gasifier efficiency.

According to the invention, it is desirable to heat the slurry 118 to a temperature in excess of 374° C. (705° F.) prior to introduction to the gasification chamber and thus increase the efficiency of the subsequent gasification process. The novel method of heating the slurry overcomes impediments associated with conventional gasification systems. The concepts disclosed can be applied to improve overall efficiency in power systems and energy conversion processes. In particular, the invention renders coal gasification more commercially attractive.

The invention has been illustrated with reference to an example embodiment but may be applied in a variety of other ways. Many equivalents, alternatives and modifications will be apparent without departing from the invention. Accordingly the scope of the invention is only limited by the claims which follow.

We claim:

1. A process for conversion of carbonaceous fuel to a gaseous product including the steps of:
   providing in a high pressure chamber a fuel slurry comprising a mixture of a solid granulated carbonaceous component and a carrier component initially in a liquid state;
   heating the carrier component while under sufficient pressure to prevent the carrier component from boiling so that the carbonaceous component does not separate from the carrier component, wherein the slurry is heated to a temperature exceeding 374° C.; and
   transferring the mixture through a pressure reduction element, to a lower pressure chamber wherein the carrier component is in a gaseous state, for combustion of the solid carbonaceous component in the lower pressure chamber without separating the solid component from the gaseous carrier component.

2. The process of claim 1 wherein the step of heating the carrier component includes increasing pressure and temperature to place the carrier component in a supercritical gaseous state while sustaining the carbonaceous component and the carrier component in a mixed state.

3. The process of claim 1 wherein the carrier component is water.

4. The process of claim 1 wherein the carbonaceous fuel is coal.

5. The process of claim 1 wherein the step of heating under sufficient pressure is effected by pumping a sufficient quantity of the slurry into the high pressure chamber to reach a supercritical pressure before transferring the mixture through an orifice to the lower pressure chamber.

6. The process of claim 1 wherein the step of heating the carrier component is effected after the chamber reaches a supercritical pressure for the carrier component and the step of heating is performed by heating the slurry through a heat exchange with exhaust gas from a combustion process.

7. A process for conversion of carbonaceous fuel to a gaseous product including the steps of:
   providing a fuel slurry comprising a mixture of a solid granulated carbonaceous component and a carrier component while the carrier component is in a liquid state;
   feeding the slurry into a high pressure chamber for heating under variable pressure conditions;
   heating the slurry to a temperature exceeding 374° C. while under sufficient pressure to prevent the carrier component from boiling and placing the carrier component in a supercritical state while sustaining the mixture in a form wherein the carbonaceous component does not separate from the gaseous carrier component; and
   transferring the mixture through a pressure reduction element to a lower pressure chamber for combustion wherein the solid carrier component is in a gaseous state without separation of the solid component from the gaseous carrier component.

8. The process of claim 7 wherein the carbonaceous material is coal and the carrier component is water.

9. The process of claim 7 wherein the slurry is heated to approximately 427° C.

10. The process of claim 7 wherein the slurry is first pressurized to 276 bara (4000 psia) and is then heated to approximately 427° C.

11. The process of claim 1 wherein the step of heating includes bringing the temperature of the carrier component above 375° C. while under pressure in the range of 3000 to 8000 psia.

12. The process of claim 7 wherein the step of heating includes bringing the temperature of the carrier component above 375° C. while under pressure in the range of 3000 to 8000 psia.

* * * * *